(12) United States Patent
Nakayama et al.

(10) Patent No.: US 12,554,946 B2
(45) Date of Patent: Feb. 17, 2026

(54) ASSET MANAGEMENT SYSTEM AND ASSET MANAGEMENT METHOD

(71) Applicants: INVENSENSE, INC, San Jose, CA (US); TDK—Japan, Tokyo (JP)

(72) Inventors: Takashi Nakayama, San Jose, CA (US); Gennadii Berkovich, Calgary (CA); Shinji Higuma, Tokyo (JP); Yusuke Ariake, Tokyo (JP)

( * ) Notice: Subject to any disclaimer, the term of this patent is extended or adjusted under 35 U.S.C. 154(b) by 18 days.

(21) Appl. No.: 18/287,171

(22) PCT Filed: Oct. 12, 2023

(86) PCT No.: PCT/US2023/035059
§ 371 (c)(1),
(2) Date: Oct. 16, 2023

(87) PCT Pub. No.: WO2024/086058
PCT Pub. Date: Apr. 25, 2024

(65) Prior Publication Data
US 2025/0245453 A1      Jul. 31, 2025

(30) Foreign Application Priority Data
Oct. 17, 2022   (JP) .................................. 2022-166468

(51) Int. Cl.
*G06Q 10/08*     (2024.01)
*G06K 7/00*      (2006.01)

(52) U.S. Cl.
CPC ........... *G06K 7/0008* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 8,344,879 B2* | 1/2013 | Harmon | G08B 21/24 455/456.1 |
| 2006/0055530 A1* | 3/2006 | Wang | G01S 5/0018 340/8.1 |
| 2019/0311321 A1* | 10/2019 | Mulaosmanovic | G06K 7/10376 |

* cited by examiner

*Primary Examiner* — Thien M Le
*Assistant Examiner* — April A Taylor (57) ABSTRACT

An asset management system that manages an asset employing a terminal unit including a tag communication unit that communicates with the tag and a position information acquisition unit that acquires position information. The position information acquisition unit starts to acquire the position information when a first condition is satisfied, such that the first condition is at least one of a condition that communication between the tag communication unit and the tag is established and the distance between the tag communication unit and the tag is equal to or less than a first threshold value. The position information acquisition unit ends acquisition of the position information when a second condition is satisfied, such that the second condition is at least one of a condition that the wireless communication is not established and the distance between the tag communication unit and the tag is more than the second threshold value.

8 Claims, 5 Drawing Sheets

| TERMINAL ID/USER ID | TAG ID | POSITION INFORMATION | TIME INFORMATION |
|---|---|---|---|
| 0001 | T001 | aaa | α α α |
| 0001 | T001 | bbb | β β β |
| 0001 | T002 | ccc | γ γ γ |
| 0002 | T001 | ddd | δ δ δ |
| ⋮ | ⋮ | ⋮ | ⋮ |

FIG. 13

ASSET MANAGEMENT SYSTEM AND ASSET MANAGEMENT METHOD

CROSS-REFERENCE TO RELATED APPLICATIONS

This application claims priority to Japanese Patent Application No. 2022-166468, filed Oct. 17, 2022.

FIELD OF THE PRESENT DISCLOSURE

The present disclosure relates to an asset management system and an asset management method.

BACKGROUND

As a system for managing the position of an asset, a system is known which attaches a tag to the asset, places a tag reading device in a room where the asset is stored, and manages the entry and exit of the asset on the basis of a result of the reading.

Here, a readable electronic tag or a QR asset tag can be used as a tag. For tag reading, for example, radio frequency identification (RFID), a beacon, Bluetooth (registered trademark) Low Energy (BLE), a two-dimensional QR code, and the like are used. However, in this method, since it is only possible to obtain static information such as the presence or absence of an asset at a place where the tag reading device is placed, and it is not possible to see dynamic information such as a person who has moved the asset, places to and from which the asset has moved, and a route through which the asset has moved, there has been a problem in terms of security of asset management. In addition, in this method, when an asset moves to a place where there is no asset reading device, it is only possible to see that the asset has moved, and as a result, a location of the asset becomes unknown in many cases, which is a problem in the asset management. In addition, in this method, it is necessary to install a tag reading device for each room where assets are stored, there is a problem that a cost burden increases according to the number of rooms (the number of reading devices), and there is a restriction that an operation cannot be performed in places where the reading devices cannot be installed.

Moreover, in this method, if there is a layout change or the like, it is necessary to change an installation place of a reading device, which is a problem because this operation takes time and effort. As another method, a method of installing a camera in a room or corridor where an asset is stored and managing a position of the asset on the basis of an image captured by the camera is known. However, this method has a problem that it is not possible to accurately manage movement of an asset in places that are blind spots for the camera or in environments where the amount of light is not sufficient.

If the number of installed cameras is increased to solve such problems, this can lead to increase in cost or a privacy problem. In addition, in this method, when photographs of an asset entering and leaving the room are taken to perform the management, it is possible to confirm the entry and exit of the asset, but it is not possible to determine where the asset comes from, by whom it is moved, and where it is moved to. Moreover, in this method, when an asset has moved to a place where there is no camera, it is only possible to see that the asset has moved, and as a result, a location of the asset becomes unknown in many cases, which is a problem in the asset management. Patent Document 1 describes a method in which a host generates asset tracking management information on the basis of position data and asset device description (refer to Patent Document 1).

PRIOR ART DOCUMENTS

Patent Document

[Patent Document 1]
  Japanese Unexamined Patent Application, First Publication No. 2017-062860
[Patent Document 2]
  Japanese Patent No. 6783751

SUMMARY

Problems to be Solved by the Invention

As mentioned above, in the asset management system currently in use, the mainstream method is a method of storing an asset and its location by attaching time and place information thereto, and, for example, a location of the asset is clearly identified by leaving a past state using a still image like a photograph. However, in still image management, since events that occur during position management are not recorded, and there is no history of who has moved the asset and how, and as a result, unclear parts may occur, and accurate management may not be possible in many cases. Patent Document 2 describes processing using map information of an area that includes a current position of a user of a portable device (refer to Patent Document 2), but does not describe a specific example of the asset management. The present disclosure has been made in consideration of such circumstances and aims to provide an asset management system and an asset management method capable of performing asset management with high accuracy.

Means for Solving the Problems

According to one aspect of the present disclosure, an asset management system that manages an asset, to which a tag capable of identifying individual information is attached, includes a terminal unit that is held by a terminal holding object, in which the terminal unit includes a tag communication unit that communicates with the tag to read the individual information, and a position information acquisition unit that acquires position information, the position information acquisition unit starts to acquire the position information as information on the asset, to which the tag is attached, when a first condition is satisfied, and ends acquisition of the position information when a second condition is satisfied, the first condition is at least one of a condition that communication between the tag communication unit and the tag is established and a condition that the distance between the tag communication unit and the tag is equal to or less than a first threshold value, and the second condition is at least one of a condition that the communication is not established and a condition that the distance between the tag communication unit and the tag is more than a second threshold value. According to another aspect of the present disclosure, an asset management method that manages, by a terminal unit held by a terminal holding object, an asset, to which a tag capable of identifying individual information is attached, the method comprising: communicating, by a tag communication unit, with the tag to read the individual information, acquiring, by a position information acquisition unit, position information, and starting, by the position information acquisition unit, to acquire the position information as information on the asset, to which the tag is attached, when a first condition is satisfied, and ending acquisition of the position information when a second condition is satisfied, in which the first condition is at least one of a condition that communication between the tag communication unit and the tag is established and a condition that the distance between the tag communication unit and the tag is equal to or less than a first threshold value, and the second condition is at least one of a condition that the communication is not established and a condition that the distance between the tag communication unit and the tag is more than a second threshold value.

Effects of the Invention

According to the asset management system and the asset management method according to the present disclosure, asset management can be performed with high accuracy.

DETAILED DESCRIPTION

Modes for Carrying Out the Invention

Hereinafter, an embodiment of the present disclosure will be described with reference to the drawings.

Asset Management System

Figure 1:
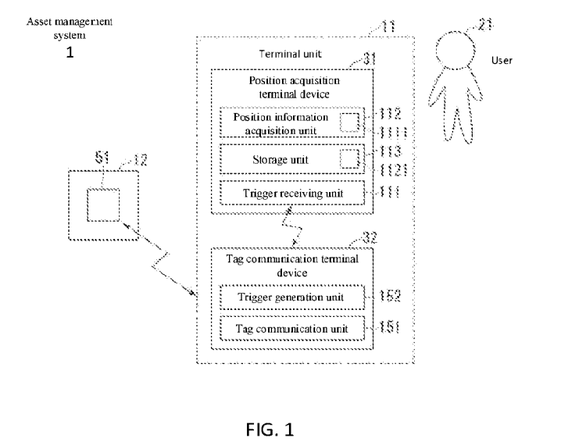
FIG. 1 is a diagram which shows an example of a schematic configuration of an asset management system according to an embodiment.

FIG. 1 is a diagram, which shows an example of a schematic configuration of an asset management system 1 according to an embodiment.

The asset management system 1 includes a terminal unit 11 and an asset 12.

In addition, FIG. 1 shows a user 21 carrying the terminal unit 11.

The asset management system 1 may be regarded as a constituent that does not include the asset 12. The terminal unit 11 includes a position acquisition terminal device 31 and a tag communication terminal device 32.

In the present embodiment, the position acquisition terminal device 31 and the tag communication terminal device 32 are configured separately, but as another example, they may be integrally configured.

Here, one or both of the position acquisition terminal device 31 and the tag communication terminal device 32 (including the case of being integrated) may be configured by installing a predetermined program in, for example, a general-purpose computer such as a smartphone, or configured as a dedicated machine. The position acquisition terminal device 31 includes a trigger receiving unit 111, a position information acquisition unit 112, and a storage unit 113.

The position information acquisition unit 112 can use different technologies for position determination. In this example, magnetic field-based positioning is described, however, other positioning technologies can be also used. The position information acquisition unit 112 stores a magnetic position correspondence table 1111 and has a storage unit that stores it. Note that the storage unit may be commonly used with the storage unit 113.

The storage unit 113 stores a management table 1121. The storage unit 113 may store any information. The tag communication terminal device 32 includes a tag communication unit 151 and a trigger generation unit 152. A tag 51 is attached to the asset 12.

A method of attaching the tag 51 to the asset 12 is not particularly limited. For example, a method of attaching the tag 51 to the asset 12 with an adhesive or the like may be used, or a method of mechanically attaching the tag 51 to the asset 12 may also be used.

There are no particular limitations in type of tags. The tag 51 can be, for example, a wireless device, like an RFID, or an UWB, or an NFC, or a BLE tag, and the like. In another example, the tag 51 can also be a QR code tag or label, or a bar code label, or the like.

The tag 51 stores individual information, and can include, for example, a storage unit that stores the individual information. Here, the asset 12 is not particularly limited, and it may be anything as long as, for example, the tags 51 can be attached thereto.

As a specific example, as an asset, a computer, a projector, a bed, medicine, a material, and the like may also be used.
<Tag communication terminal device>

The tag communication terminal device 32 will be described.

The tag communication unit 151 communicates with the tag 51 of the asset 12 and reads individual information stored in the tag 51. The tag communication unit 151 can communicate wirelessly in case of wireless tags like RFID, UWB, NFC, and BLE tags to read individual information stored in the tag 51. In other cases, for example, the tag communication unit 151 can read individual information stored on the tag 51 in a visual form by scanning a QR or bar code.

Here, various methods may be used as a method of communication between the tag communication unit 151 and the tag 51 to read individual information stored on the tag 51.

In the configuration of the present embodiment, communication is established between the tag communication unit 151 and the tag 51 when a distance between the tag communication terminal device 32 (the tag communication unit 151) and the tag 51 is equal to or less than a predetermined threshold value, and communication is not established between the tag communication unit 151 and the tag 51 when the distance exceeds the threshold value. For example, in case of passive RFID and NFC tags, the predetermined threshold value can be the maximum read range for the specific type of the tag and the reader. For QR code and bar code tags or labels, the predetermined threshold can be a maximum read range by a scanning device.

In the other example, in case of BLE or UWB tags, the predetermined threshold value can be set by a user, for example, 0.5 m, 1 m, or the like, and the distance between the tag communication unit 151 and the tag 51 can be measured using a ranging method that is specific for the type of the tag. For example, in case of using a BLE beacon as a tag, the distance can be measured based on RSSI, whereas for UWB tag the distance can be measured using time difference of arriving (TDoA) or a similar method.

The trigger generation unit 152 generates a predetermined trigger signal (referred to as a start trigger signal in the present embodiment) with respect to the position acquisition terminal device 31 when communication with the tag 51 is established by the tag communication unit 151.

After that, when the tag communication unit 151 fails to establish communication with the tag 51, the trigger generation unit 152 generates a predetermined trigger signal (referred to as an end trigger signal in the present embodiment) with respect to the position acquisition terminal device 31.

As described above, in the present embodiment, examples of a trigger signal include a start trigger signal and an end trigger signal. Here, as a method of generating the trigger signal, for example, a method of transmitting a trigger signal to the position acquisition terminal device 31 may be used.

In addition, a trigger signal may include individual information received from the tag 51 by, for example, the tag communication unit. <Position acquisition terminal device>

The position acquisition terminal device 31 will be described.

The trigger receiving unit 111 receives a trigger signal transmitted from the trigger generation unit 152 of the tag communication terminal device 32.

Here, communication between the trigger generation unit 152 of the tag communication terminal device 32 and the trigger receiving unit 111 of the position acquisition terminal device 31 may be, for example, wireless communication or wired communication. The trigger receiving unit 111 receives a start trigger signal from the tag communication terminal device 32, and thereby the position information acquisition unit 112 starts processing of acquiring position information and continuously performs the processing.

Here, as a form of continuously performing the processing of acquiring position information, for example, a form of acquiring position information for each predetermined period may be used. The predetermined period may be, for example, a regular period or a predetermined irregular timing period. The trigger receiving unit 111 receives an end trigger signal from the tag communication terminal device 32, and thereby the position information acquisition unit 112 ends the processing of acquiring position information. As described above, in the present embodiment, the position information acquisition unit 112 continuously acquires position information from when the start trigger signal is received to when the end trigger signal is received. The storage unit 113 stores the position information acquired by the position information acquisition unit 112 in the management table 1121.

Here, the storage unit 113 may store, for example, individual information received from the tag communication terminal device 32 by the trigger receiving unit 111 in the management table 1121 in association with the position information, and time information may be stored in the management table 1121.

The time information may include information such as year, month, day, hour, minute, and second. Here, the position acquisition terminal device 31 may have a function of receiving login information of the user 21 according to an operation of the user 21 and the like and identifying a user of the position acquisition terminal device 31 on the basis of the login information.

For example, it may be possible for the position acquisition terminal device 31 to be used by each of a plurality of users, and in this case, for example, the position acquisition terminal device 31 specifies a user on the basis of the login information. In the present embodiment, a configuration is shown in which the position acquisition terminal device 31 stores information of the storage unit 113 (for example, information of the magnetic position correspondence table 1111 and information of the management table 1121), but a configuration in which the information is stored in an external device of the position acquisition terminal device 31 (for example, a database) may also be used as another example. In this case, for example, the terminal unit 11 may be able to store information in such an external device and read out information stored in the external device. In the example of FIG. 1, a case in which a holding object (a terminal holding object) that holds the terminal unit 11 is a person (for example, the user 21 who is a terminal holder) is shown, but it may be a robot that can travel autonomously.

A motor vehicle is not particularly limited, and for example, a vehicle that moves electrically, by an engine, or the like may be used.

In this manner, there may be various types of terminal holding objects.

An automatic guided vehicle (AGV) may also be used as the terminal holding object. Here, when the terminal holding object is a motor vehicle or a robot, a function of a terminal unit mounted on the terminal holding object may be to store, for example, identification information of the terminal holding object in advance. In this case, a function of the terminal unit uses, for example, the identification information of the terminal holding object instead of a user ID. <Position information acquisition unit>

Figure 2:
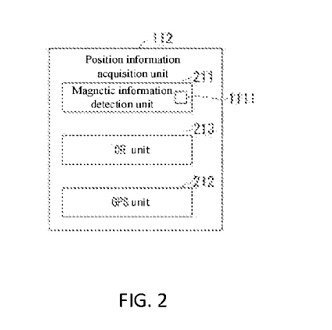
FIG. 2 is a diagram which shows an example of a configuration of a position information acquisition unit according to the embodiment.

FIG. 2 is a diagram which shows an example of a configuration of the position information acquisition unit 112 according to the embodiment. The example of the position information acquisition unit 112 can include a magnetic information detection unit 211 (a magnetic field information measurement unit), a GPS unit 212, and a DR unit 213. The position information acquisition unit 112 can be equipped with sensors, like a magnetometer, accelerometers, and gyroscopes, which can be internal, i.e., integrated into the unit 112, or external. DR module can provide either pedestrian dead reckoning (PDR), which is based on measurements from inertial sensors such as accelerometers and gyroscopes, or vehicle dead reckoning (VDR), which can also be based on measurements from inertial sensors, and/or odometry sensors like a wheel sensor, a Doppler sensor, etc.

The magnetic information detection unit 211 of the position information acquisition unit 112 stores the magnetic position correspondence table 1111. <Magnetic position correspondence table>

Figure 3:
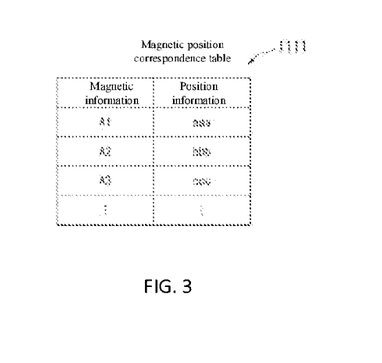
FIG. 3 is a diagram which shows an example of a magnetic position correspondence table according to the embodiment.

FIG. 3 is a diagram which shows an example of the magnetic position correspondence table 1111 according to the embodiment. The magnetic position correspondence table 1111 stores information of magnetic field (magnetic information) and information on a position (position information) in association with each other.

Here, magnetic information and position information are determined and stored on the basis of an experiment or a theory in advance.

In the present embodiment, position information is set for each piece of the magnetic information. In the example of FIG. 3, the magnetic information is simply represented as "A1," "A2," and "A3," but any information may be used as the magnetic information, and for example, information related to magnetic field strength, horizontal and vertical components of magnetic field, a 3D vector of magnetic field, a waveform of magnetic signal, etc., which can be used separately or in any combination. In the example of FIG. 3, the position information is simply represented as "aaa," "bbb," and "ccc," but any information may be used as the position information, and latitude and longitude information may be used, or information representing positions of three axial positions in a three-dimensional space or the like may also be used. An altitude or a floor number can be used as a third coordinate. The magnetic information detection unit 211 detects magnetic information using magnetometer measurements.

Then, the magnetic information detection unit 211 acquires position information corresponding to the detected magnetic information on the basis of the information of the magnetic position correspondence table 1111. Here, in the present embodiment, the magnetic information detection unit 211 detects magnetic information of an environmental magnetic field.

The environmental magnetic field includes, for example, a magnetic field due to magnetic field of the Earth (geomagnetic field).

One or more predetermined artificial magnetic anchors may be installed at predetermined positions in advance, and the magnetic information detection unit 211 may detect information on magnetic field produced by the magnetic anchors. By surveying geomagnetic field in advance and converting it into a magnetic map, it is possible to compare magnetic data acquired by the magnetic information detection unit 211 with the magnetic map and to determine a position (for example, a current position) of the terminal unit 11. The magnetic position correspondence table 1111, which stores information of magnetic field and information on a position in association with each other, can be an example of the magnetic map. As described above, in the present embodiment, the position may be specified on the basis of natural geomagnetic field, the position may be specified on the basis of the magnetic field produced by the artificial magnetic anchors, or the position may be specified on the basis of both. For example, when the terminal unit 11 is configured using a device (for example, a smartphone) having a magnetic detection function, the magnetic detection function can be used as the magnetic information detection unit 211. The GPS unit 212 has a GPS receiver and acquires information on a position (for example, latitude, longitude). Note that it is possible to specify an absolute position using the GPS function. Using measurements of inertial sensors (accelerometers and gyroscopes), the DR unit 213 acquires, for example, information on a position from a pedestrian dead reckoning (PDR) device having a PDR function. Note that it is possible to specify relative positions using the PDR function.

In the present embodiment, the PDR device may be provided in, for example, a belt or the like of the user 21.

Note that the DR unit 213 itself may have the function of a PDR device. As another example, the DR unit 213 may acquire information on a position from a vehicle dead reckoning (VDR) device having a VDR function. Note that it is possible to specify relative positions using the VDR function.

In this case, the VDR device may be provided in, for example, a mobile object on which the terminal unit 11 is mounted.

Note that the DR unit 213 itself may have the function of a VDR device. Here, in the present embodiment, in the position information acquisition unit 112, specification of a position may be performed on the basis of at least one of the information acquired by the magnetic information detection unit 211, the information acquired by the GPS unit 212, and the information acquired by the DR unit 213.

As an example, the position information acquisition unit 112 may use the information acquired by the GPS unit 212 or the information acquired by the DR unit 213 when it specifies a position on the basis of a measurement result of the magnetic information detection unit 211.

Note that the example of FIG. 2 shows a case where the position information acquisition unit 112 includes the GPS unit 212 and the DR unit 213, but as another example, the position information acquisition unit 112 may be configured not to include one or both of the GPS unit 212 and the DR unit 213.

In addition, in a configuration in which position detection based on magnetic information is not performed, the magnetic position correspondence table 1111 may not be provided. As another example, the position information acquisition unit 112 may perform the specification of a position using a Wi-Fi positioning method, a BLE beacon positioning method, or the like.

Combination or integration of magnetic positioning and/or other positioning methods with PDR or VDR can be used in the position information acquisition unit 112. As a result, in the present embodiment, the position of an asset can be managed more accurately than when only one positioning method is used. Combination or integration of magnetic positioning with PDR or VDR can improve positioning accuracy when operating indoors, whereas combination of GPS with PDR or VDR helps to improve positioning accuracy outdoors. Other positioning methods, like Wi-Fi-based or BLE beacon-based, can also be integrated with magnetic-based positioning, GPS, and PDR or VDR. In the present embodiment, when management of the asset 12 is performed in the terminal unit 11, a position determined by the position information acquisition unit 112 can be regarded as an exact position of the asset 12. As another example, the position of the asset 12 can be regarded as an area of the predetermined size surrounding the position determined by the position information acquisition unit 112, i.e., the position when the asset 12 is in a vicinity of the position information acquisition unit 112. <Management table>

Figure 4:
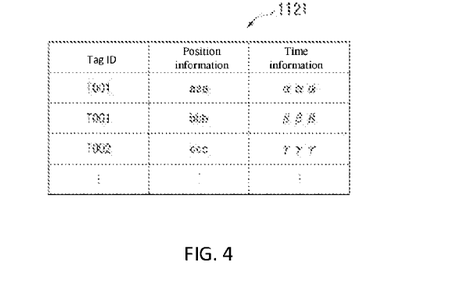
FIG. 4 is a diagram which shows an example of a management table according to the embodiment.

FIG. 4 is a diagram which shows an example of the management table 1121 according to the embodiment. The management table 1121 stores a tag ID, information on a position (position information), and information on time (time information) in association with each other. In the terminal unit 11, it is possible to collectively manage information on a plurality of assets according to the information of the management table 1121. In the example of FIG. 4, tag IDs are represented as "T001" and "T002," but any information may be used as a tag ID.

In the example of FIG. 4, time information is simply represented as "ααα," "βββ," and "γγγ," but any information may be used as time information, for example year, month, day, hour, minute, and second.

Position information in the example of FIG. 4 is the same as in the example of FIG. 2. <Configuration example of terminal unit>

Figure 5:
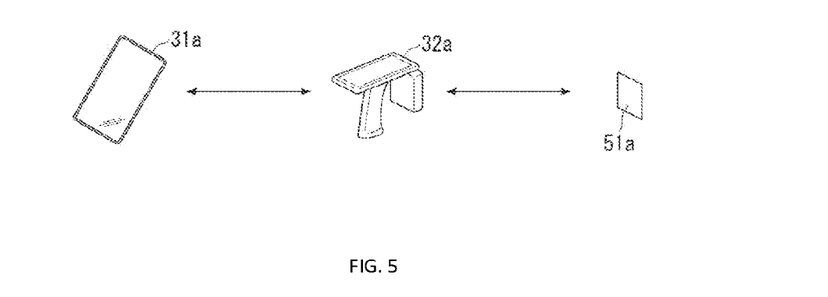
FIG. 5 is a diagram which shows a configuration example of a terminal unit according to the embodiment.

FIG. 5 is a diagram which shows a configuration example of a terminal unit 11*a* according to the embodiment. The terminal unit 11*a* is an example of the terminal unit 11 shown in FIG. 1.

The terminal unit 11*a* includes a smartphone 31*a* and an RFID scanner 32*a*. In addition, FIG. 5 shows an RFID tag 51*a*. Here, the smartphone 31*a* is an example of the position acquisition terminal device 31 shown in FIG. 1, and the RFID scanner 32*a* is an example of the tag communication terminal device 32 shown in FIG. 1. The smartphone 31*a* and the RFID scanner 32*a* are paired by, for example, Bluetooth (registered trademark).

The RFID scanner 32*a* can perform wireless communication with the tag 51*a* and read individual information stored in the tag 51*a*, for example, when a distance from the tag 51*a* is less than 2 m. In this example, the predetermined threshold value mentioned above is 2 m.

Figure 6:
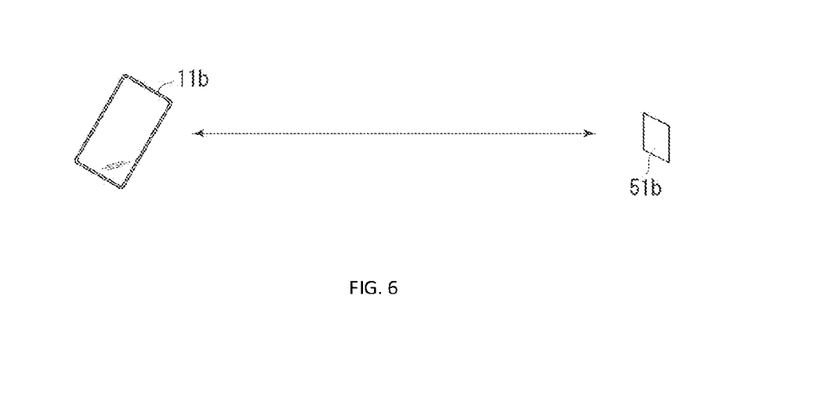
FIG. 6 is a diagram which shows another configuration example of the terminal unit according to the embodiment.

As a communication method, a method other than RFID may be used. FIG. 6 is a diagram which shows another configuration example of a terminal unit 11*b* according to the embodiment. The terminal unit 11*b* consists of a smartphone.

FIG. 6 shows the BLE tag 51*b*.

The terminal unit 11*b* performs wireless communication with the BLE tag 51*b* to read individual information stored in the tag 51*b*. Note that communication such as ultra-wide band (UWB) may be used instead of BLE communication.

Asset Management Processing

Figure 7:
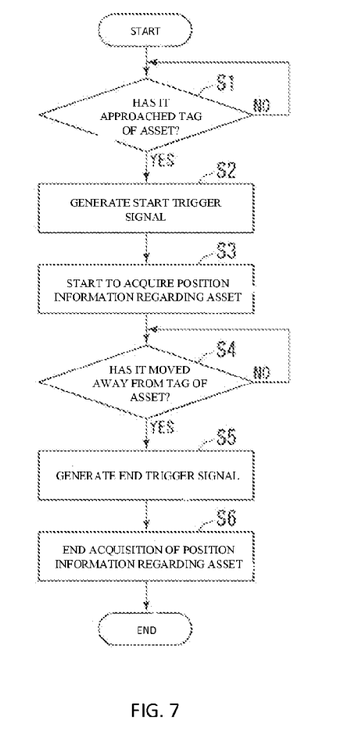
FIG. 7 is a diagram which shows an example of a procedure of asset management processing performed in the terminal unit according to the embodiment.

FIG. 7 is a diagram which shows an example of a procedure of asset management processing performed in the terminal unit 11 according to the embodiment. In the present embodiment, the position acquisition terminal device 31 and the tag communication terminal device 32 are connected for communication in advance by an operation of the user 21 or the like. In this example, for example, the constituent shown in FIG. 5 may be used as the terminal unit 11.

In addition, as the position information, for example, latitude information and longitude information may also be used. (Step S1)

In the terminal unit 11, the tag communication unit 151 determines whether it has approached the tag 51 of the asset 12 to a predetermined degree.

As a result of this determination, when it is determined that the tag communication unit 151 has approached the tag 51 of the asset 12 to a predetermined degree (YES in step S1), the procedure shifts to processing of step S2 in the terminal unit 11.

On the other hand, as a result of this determination, when it is determined that the tag communication unit 151 has not approached the tag 51 of the asset 12 to a predetermined degree (NO in step S1), the processing of step S1 is repeated in the terminal unit 11. Here, in the present embodiment, the tag communication unit 151 determines that it has approached the tag 51 of the asset 12 to a predetermined degree when wireless communication with the tag 51 of the asset 12 is established. (Step S2)

In the terminal unit 11, the trigger generation unit 152 generates a start trigger signal.

Then, the procedure shifts to processing of step S3 in the terminal unit 11.

(Step S3)

In the terminal unit 11, the position information acquisition unit 112 starts to acquire the position information regarding the asset 12 and continuously acquires position information.

Then, in the terminal unit 11, the procedure shifts to processing of step S4. Here, the position information acquisition unit 112 stores the acquired position information in the management table 1121, for example, in real time or when the acquisition of the position information ends (for example, when the processing of this flow ends). (Step S4)

In the terminal unit 11, the tag communication unit 151 determines whether it has moved away from the tag 51 of the asset 12 to a predetermined degree.

As a result of this determination, when it is determined that the tag communication unit 151 has moved away from the tag 51 of the asset 12 to a predetermined degree (YES in step S4), the procedure shifts to processing of step S5 in the terminal unit 11.

On the other hand, as a result of this determination, when it is determined that the tag communication unit 151 has not moved away from the tag 51 of the asset 12 to a predetermined degree (NO in step S4), the processing of step S4 is repeated in the terminal unit 11. Here, in the present embodiment, it is determined that the tag communication unit 151 has moved away from the tag 51 of the asset 12 to a predetermined degree when wireless communication with the tag 51 of the asset 12 is not established from an established state. (Step S5)

In the terminal unit 11, the trigger generation unit 152 generates an end trigger signal.

Then, the procedure shifts to processing of step S6. (Step S6)

In the terminal unit 11, the position information acquisition unit 112 ends the acquisition of the position information regarding the asset 12.

Then, processing of this flow in the terminal unit 11 ends. Here, in the present embodiment, a state, in which wireless communication between the tag communication unit 151 of the terminal unit 11 and the tag 51 of the asset 12 is established, is considered to be a state in which a distance between the terminal unit 11 (the user 21) and the asset 12 is equal to or less than a predetermined distance, and a state, in which the wireless communication is not established, is considered to be a state in which the distance between the terminal unit 11 (the user 21) and the asset 12 exceeds the predetermined distance. As described above, in the present embodiment, for example, a case is shown in which whether the wireless communication between these is established is determined according to the distance between the tag communication unit 151 of the terminal unit 11 and the tag 51 of the asset 12. As another example, a configuration in which the trigger generation unit 152 generates a start trigger signal when a strength of a wireless communication signal, e.g., RSSI, between the tag communication unit 151 of the terminal unit 11 and the tag 51 of the asset 12 is equal to or higher than a predetermined first threshold value, and then the trigger generation unit 152 generates an end trigger signal when the strength of the wireless communication signal (RSSI) is less than a predetermined second threshold value may also be used. This configuration is equivalent to former in some cases of wireless communication, like for example BLE, because RSSI depends on the distance between the tag communication unit 151 of the terminal unit 11 and the tag 51 of the asset 12.

Here, the second threshold value may be, for example, the same value as the first threshold value, or may be a different value. Here, in the asset management system 1 according to the present embodiment, for example, since the user 21 moves the asset 12 while carrying the terminal unit 11, a rule may be established that a user who does not carry the terminal unit 11 may not move the asset 12. As a result, all movements of the asset 12 are managed.

In addition, in the asset management system 1 according to the present embodiment, for example, a camera may be installed at an arbitrary position where the asset 12 can be present, and monitoring can be performed such that a user who does not carry the terminal unit 11 does not move the asset 12 on the basis of a captured image of the camera.

<Example of asset management in management area>

Examples of asset management in a management area are shown with reference to FIGS. 8 to 11.

Note that information of management areas shown in FIGS. 8 to 11 may be regarded as, for example, map information of the management areas.

Figure 8:
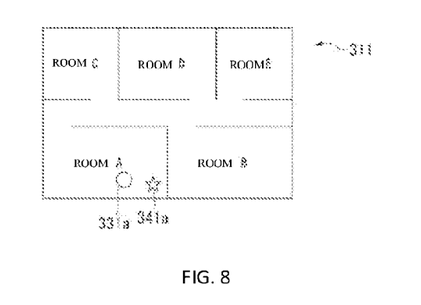
FIG. 8 is a diagram which shows an example of asset management in a management area according to the embodiment.

In this example, a case in which the user 21 transports the asset 12 from a predetermined position to another predetermined position while the user 21 carries the terminal unit 11 will be described. FIG. 8 is a diagram which shows an example of asset management in a management area 311 according to the embodiment. In this example, the management area 311 is an area having a room A, a room B, a room C, a room D, a room E, and a corridor connecting these rooms A to E. In the example of FIG. 8, a user position 331a and an asset position 341a are shown.

The user position 331a represents a position where the user 21 is present, and in this example, it is assumed that the terminal unit 11 is also present at the same position.

The asset position 341a represents a position where the asset 12 is present. In the example of FIG. 8, the asset 12 is present in the room A. Then, it shows a state in which the user 21 is approaching the asset 12 from a distance from the asset 12 and takes the asset 12.

Figure 9:
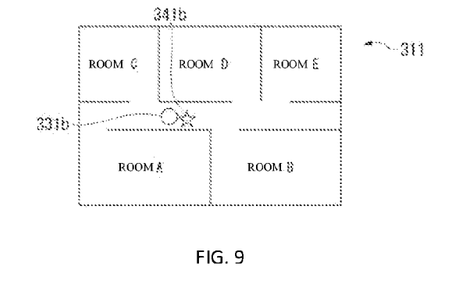
FIG. 9 is a diagram which shows an example of asset management in the management area according to the embodiment.

In this case, the terminal unit 11 starts to acquire the position information regarding the asset 12. In this manner, when the user 21 approaches the asset 12, they are linked by communication between the tag communication unit 151 of the terminal unit 11 and the tag 51 of the asset 12. FIG. 9 is a diagram which shows an example of asset management in the management area 311 according to the embodiment. In the example of FIG. 9, a user position 331b and an asset position 341b are shown.

The user position 331b represents a position to which the user position 331a has moved.

The asset position 341b represents a position to which the asset position 341a has moved. The example of FIG. 9 shows a state in which the user 21 is transporting the asset 12 and is in the corridor. In this state, the user 21 and the asset 12 are moving together.

Figure 10:
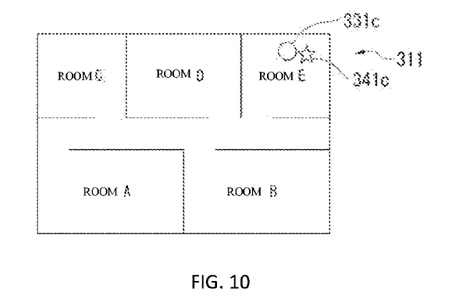
FIG. 10 is a diagram which shows an example of asset management in the management area according to the embodiment.

In this case, the terminal unit 11 continuously acquires position information regarding the asset 12. FIG. 10 is a diagram which shows an example of asset management in the management area 311 according to the embodiment. In the example of FIG. 10, a user position 331c and an asset position 341c are shown.

The user position 331c represents a position to which the user position 331b has moved.

The asset position 341c represents a position to which the asset position 341b has moved. The example of FIG. 10 shows a state in which the user 21 has placed the asset 12 in the room E. Up to this state, the user 21 and the asset 12 are moving together.

Figure 11:
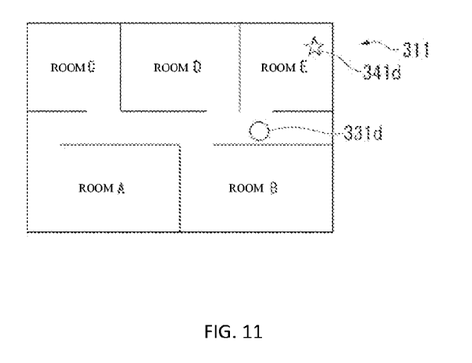
FIG. 11 is a diagram which shows an example of asset management in the management area according to the embodiment.

The example in FIG. 10 shows a state in which transportation of the asset 12 by the user 21 has been completed. FIG. 11 is a diagram which shows an example of asset management in the management area 311 according to the embodiment. In the example of FIG. 11, a user position 331d and an asset position 341d are shown.

The user position 331d represents a position to which the user position 331c has moved.

The asset position 341d represents a position to which the asset position 341c has moved. The example of FIG. 11 shows a state in which the user 21 is moving away from the asset 12 after placing the asset 12 in the room E.

In this case, the terminal unit 11 ends the acquisition of the position information regarding the asset 12.

Here, in the terminal unit 11, for example, regarding the asset 12, it may be considered that the asset 12 is present at a position specified by the position information when the acquisition of the position information is completed. In the terminal unit 11, the position information may be stored in the management table 1121 or the like as information on the position where the asset 12 is present. In this manner, in the asset management system 1, it is possible to track the position of the asset 12 in real time.

In addition, in the asset management system 1, it is possible to manage information on the user 21 who transports the asset 12. The information may be, for example, the identification information of the user 21 or the identification information of the terminal unit 11 carried by the user 21.

As the identification information of the terminal unit 11, for example, identification information of the position acquisition terminal device 31 constituting the terminal unit 11 may be used, identification information of the tag communication terminal device 32 constituting the terminal unit 11 may be used, or identification information assigned to an entirety of the terminal unit 11 may also be used.

Comprehensive Asset Management System

Figure 12:
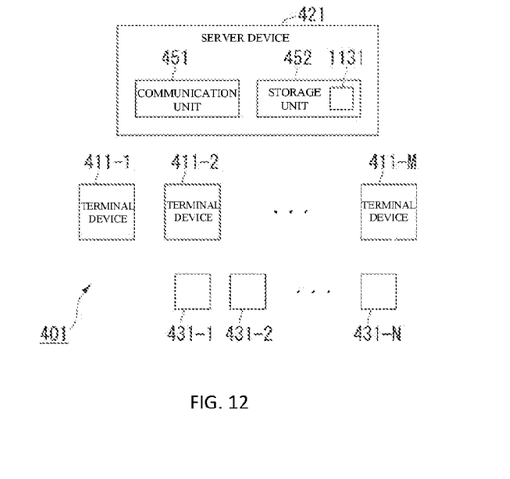
FIG. 12 is a diagram which shows an example of a schematic configuration of a comprehensive asset management system according to the embodiment.

FIG. 12 is a diagram which shows an example of a schematic configuration of the comprehensive asset management system 401 according to the embodiment.

The comprehensive asset management system 401 includes a plurality of M terminal units 411-1 to 411-M, a plurality of N assets 431-1 to 431-N, and a server device 421.

Here, each of the terminal units 411-1 to 411-M has the same function as the terminal unit 11 shown in FIG. 1.

In addition, in the example of FIG. 12, each of the terminal units 411-1 to 411-M has a function of a communication unit that communicates with the server device 421.

<Server device>

The server device 421 includes a communication unit 451 and a storage unit 452.

The communication unit 451 has a function of performing communication.

The storage unit 452 stores a comprehensive asset management table 1131. The storage unit 452 may store any information. In the example of FIG. 12, a communication unit of each of the terminal units 411-1 to 411-M wirelessly communicates with the communication unit 451 of the server device 421. Then, each of the terminal units 411-1 to 411-M transmits predetermined information to the server device 421.

The predetermined information includes, for example, one or both of a terminal ID and a user ID (a terminal ID and a user ID), a tag ID, information on a specified position, and information on a time corresponding to the position (for example, a time at which the position has been specified or a predetermined time in the vicinity thereof) for each of the terminal units 411-1 to 411-M.

Here, the terminal ID is, for example, identification information that identifies each of the terminal units 411-1 to 411-M.

Also, the user ID is, for example, identification information that identifies the user of each of the terminal units 411-1 to 411-M.

Each of the terminal units 411-1 to 411-M may use, for example, a part or all of the login information received from the user as the user ID.

The server device 421 stores and manages information received from the terminal units 411-1 to 411-M in the comprehensive asset management table 1131.

Comprehensive Asset Management Table

Figure 13:
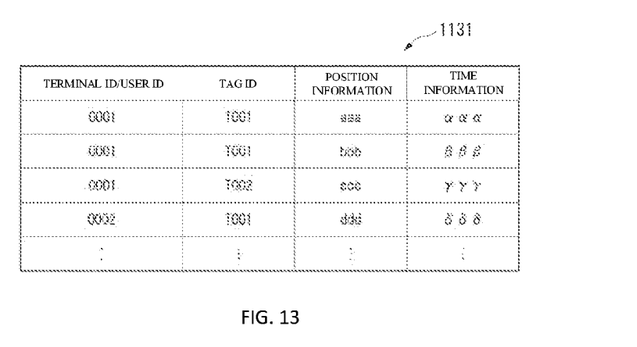
FIG. 13 is a diagram which shows an example of a comprehensive asset management table according to the embodiment.

FIG. 13 is a diagram which shows an example of the comprehensive asset management table 1131 according to the embodiment. The comprehensive asset management table 1131 stores one or both of a terminal ID and a user ID (terminal ID/user ID), a tag ID, position information, and time information in association with each other. In the server device 421, it is possible to collectively manage information on a plurality of assets 431-1 to 431-N according to the information of the comprehensive asset management table 1131. In the example of FIG. 13, the terminal ID and the user ID are represented as "0001" and "0002" as single number information, but any information may be used as the terminal ID and user ID, respectively.

In the example of FIG. 13, the tag ID is represented as "T001" and "T002," but any information may be used as the tag ID.

The position information and the time information in the example of FIG. 13 are the same as in the example of FIG. 4. Here, for example, on the basis of the information of the comprehensive asset management table 1131, it is possible to associate date and time, total inventory of the assets, and an inventory of each of the plurality of rooms (for example, the room A to the room E).

Date and time represent a day and time. Any time information may be used instead of the date and time.

Total inventory represents all inventories and represents the assets 431-1 to 431-N in this example.

Each column of room A to room E stores information on an asset that is present in each room. Here, as the information on an asset, for example, information on a tag attached to the asset (for example, individual information), information on a position of the asset acquired, and information for identifying (specifying) a user transporting the asset may be used.

As the information for identifying a user, for example, information (a user ID) for identifying each user itself may be used, or when a user and the terminal unit 11 are associated with each other, information for identifying the terminal unit 11 carried by the user may also be used. [About the above embodiment]

As described above, in the asset management system 1 according to the present embodiment, it is possible to perform asset management with high accuracy.

In the asset management system 1 according to the present embodiment, it is possible to reduce a risk of loss of the asset 12 by managing the position of the asset 12 dynamically rather than statically, and thus the introduction is possible at low cost, and safe and flexible asset management can be operated without restrictions on a place. In the asset management system 1 according to the present embodiment, for example, it is possible to perform location management in real time by managing the asset 12 in a situation where indoor positioning by geomagnetic field or the like is possible, and at the same time, to manage detailed information such as by whom, how, and a place to which it is moved, thereby greatly improving productivity. In the asset management system 1 according to the present embodiment, along with a link between the asset 12 and a position where it is positioned, or instead of the link, a position of a person or a moving motor vehicle (for example, a forklift or a trolley) and the asset 12 are linked, and thereby, it is possible to collect a real-time movement history for the movement of the asset 12 and clearly scrutinize a history of the movement. In the present embodiment, basically, regarding indoor position positioning, based on a geomagnetic map acquired in advance, the magnetic data acquired by the terminal unit 11 (for example, a smartphone or a dedicated terminal) is compared with the magnetic map and indoor position positioning of a person or a motor vehicle is executed. In addition, an electronic tag of a RFID or BLE beacon is attached to the asset 12, and when a person, a motor vehicle, or the like approaches the asset 12, predetermined information is linked to the indoor positioning position of the person, the motor vehicle, or the like to monitor the movements. In addition, the asset management system 1 according to the present embodiment can be applied to, for example, tracking of the position in real-time, and can manage dynamic information.

In addition, the asset management system 1 according to the present embodiment can be applied indoors where GPS radio waves do not reach, for example, by using information on magnetic field. In the asset management system 1 according to the present embodiment, it is possible to associate a movement of the asset 12 with a movement of the user 21 (or a motor vehicle, or the like).

As a result, in the asset management system 1, it is possible to specify a terminal holding object that has moved the asset 12, and it is possible to, for example, specify the user 21 who has moved the asset 12 and confirm a reason for moving the asset 12, and the like. In the asset management system 1 according to the present embodiment, for example, it is possible to manage time, the number of assets, and a terminal holding object (correspondents, or the like) for an intermediate range of each time point in real time.

As a specific example, it is possible to manage a status of asset movement, such as receiving 100 predetermined assets, inspecting 98 out of them, then, storing 98 of these in a storage, shipping 50 of them to a warehouse, and returning 48 of them, according to a change in position of each asset and information on a holding object that has transported each asset. For example, the asset management system 1 has a terminal device (the position acquisition terminal device 31) from which a terminal holding object (the user 21, or the like) can acquire its own position information, and a terminal device (the tag communication terminal device 32) that can be connected to the position acquisition terminal device 31 and read the individual information of the tag 51 attached to the asset 12. As a specific example, when a terminal holding object approaches the asset 12 within a certain distance, the tag communication terminal device 32 held by the terminal holding object reads the individual information of the tag 51 of the asset 12 and, using this as a start trigger signal, the position acquisition terminal device 31 starts continuously to acquire the position information at that time.

After that, a time when the terminal holding object and the asset 12 are separated by a certain distance, and the tag communication terminal device 32 cannot read the information of the tag 51 of the asset 12 is set as an end trigger signal, and the position information acquired last by the position acquisition terminal device 31 is recorded as the position information of a corresponding asset 12. Here, other conditions may be used as a condition for generating the start trigger signal and a condition for generating the end trigger signal. With such a configuration, in the asset management system 1, it is possible to acquire the position of the asset 12 in real time according to movement of a terminal holding object. As a result, in the asset management system 1, it is possible to grasp by whom, when, from where to where, and through which route the asset 12 is moved, and thereby safe asset management can be operated.

Here, "by whom" can be determined on the basis of login information of the terminal unit 11, for example, when the terminal holding object is a user.

In addition, "by whom" can be determined on the basis of identification information of a motor vehicle or identification information of a robot, for example, when the terminal holding object is the motor vehicle or the robot. In this case, the terminal unit 11 (for example, the position acquisition terminal device 31, or the like) functions to store identification information of the terminal holding object instead of login information. In addition, "when" can be determined on the basis of, for example, an acquisition time of the position information. Acquisition of the position information is performed, for example, in real time.

Moreover, "from where to where" and "through which route" can be determined on the basis of the position information and changes in its position.

In the asset management system 1, since the position information is acquired by the terminal unit 11 carried by the terminal holding object, the position of an asset can be managed without restrictions on a place, and, for example, there is no need to install a reading device for each room. For this reason, the asset management system 1 can be introduced at a low cost, and can easily respond to layout changes, and the like, enabling a flexible operation. In the asset management system 1 according to the present embodiment, for example, the position can be specified by measuring the environmental magnetic field information in real time and referring to the magnetic information measured in advance in association with the position information.

As a result, in the asset management system 1, for example, the position of an asset can be managed more accurately as compared to other positioning methods.

Combination of magnetic positioning and/or other positioning methods with PDR can be used in the terminal unit 11. As a result, in the present embodiment, the position of an asset can be managed more accurately than when only the another positioning method is used. This effect of improving positioning accuracy and the user's convenience is exhibited even when the terminal holding object is, for example, a person and the person moves freely.

The same affect is achieved by combination of magnetic and/or other positioning methods with VDR in positioning in the terminal unit 11. As a result, in the present embodiment, the position of an asset can be managed more accurately than when only one positioning method is used.

This effect is exhibited even when the terminal holding object is, for example, a motor vehicle or a robot, and the terminal holding object moves freely. The tag 51 is, for example, at least one type of tag selected from tags such as an RFID. Then, the tag communication terminal device 32 capable of reading the information of such a tag 51 is used.

As a result, in the present embodiment, it is possible to read the individual information of the tag 51 according to a distance from the terminal holding object, and thereby the position of an asset can be managed more accurately. In the present embodiment, for example, it is possible to manage the positions of all assets, from heavy objects that need to be transported by motor vehicles such as forklifts to assets that are manually transported. In the present embodiment, the position acquisition terminal device 31 and the tag communication terminal device 32 may be, for example, different devices or may be a common device (the same device).

For example, by using these devices as a common device, it is possible to operate them at a lower cost. Note that a program for realizing functions of any component in any device described above may be recorded in a computer-readable recording medium, and the program may be read into a computer system and executed. It is assumed that "computer system" as used herein includes an operating system or hardware such as peripheral devices. In addition, "computer-readable recording medium" refers to a portable medium such as a flexible disk, an optical magnetism disc, a ROM, or a compact disc (CD)-read only memory (ROM), or a storage device such as a hard disk embedded in a computer system. In addition, it is assumed that "computer-readable recording medium" includes those that hold a program for a certain period of time, such as volatile memory inside a computer system that serves as a server or client when the program is transmitted via a network such as the Internet or a communication line such as a telephone line. The volatile memory may be, for example, a random access memory (RAM). The recording medium may be, for example, a non-transitory recording medium. In addition, the program described above may be transmitted from a computer system that stores this program in a storage device or the like to another computer system via a transmission medium or by transmission waves in a transmission medium. Here, the "transmission medium" for transmitting the program refers to a medium having a function of transmitting information, such as a network such as the Internet or a communication line such as a telephone line.

Moreover, the program described above may be a program for realizing some of the functions described above. Furthermore, the program described above may also be a so-called difference file that can realize the functions described above in combination with a program already recorded in a computer system. A difference file, which may be called a difference program, represents changes between two versions of firmware or software. This file allows to reduce amount of data that needs to be transferred and reducing the required for the updating process. In addition, the functions of any component in any device described above may be realized by a processor. For example, each processing in the embodiment may be realized by a processor that operates based on information such as a program, and a computer-readable recording medium that stores the information such as a program. Here, in the processor, for example, the function of each part may be realized by separate hardware, or the function of each part may be realized by integrated hardware. For example, the processor may include hardware, and the hardware may include at least one of a circuit that processes digital signals and a circuit that processes analog signals. For example, the processor may be configured using one or a plurality of circuit devices and/or one or a plurality of circuit elements mounted on a circuit board. An integrated circuit (IC) or the like may be used as the circuit device, and a resistor, a capacitor, or the like may be used as the circuit element. Here, the processor may be, for example, a CPU. However, the processor is not limited to the CPU, and, for example, various processors such as a graphics processing unit (GPU) or a digital signal processor (DSP) may also be used. In addition, the processor may be, for example, a hardware circuit based on an application specific integrated circuit (ASIC). Moreover, the processor may be configured from, for example, a plurality of CPUs, or may be configured from a plurality of hardware circuits based on the ASIC. Moreover, the processor may be configured from, for example, a combination of a plurality of CPUs and a plurality of hardware circuits based on the ASIC. Moreover, the processor may include, for example, one or more of an amplifier circuit, a filter circuit, and the like for processing analog signals. Although the embodiment of this disclosure has been described in detail with reference to the drawings, a specific configuration is not limited to the present embodiment, and includes a design and the like in a range not departing from the gist of this disclosure.

APPENDIX

A configuration example will be shown as below.

Configuration Example 1

An asset management system that manages an asset to which a tag capable of identifying individual information is attached includes a terminal unit held by a terminal holding object, in which the terminal unit includes a tag communication unit that communicates with the tag to read the individual information, and a position information acquisition unit that acquires position information, the position information acquisition unit starts to acquire the position information as information on the asset to which the tag is attached when a first condition is satisfied, and ends acquisition of the position information when a second condition is satisfied, the first condition is at least one of a condition that communication between the tag communication unit and the tag is established and a condition that the distance between the tag communication unit and the tag is equal to or less than a first threshold value, and the second condition is at least one of a condition that the communication is not established and a condition that the distance between the tag communication unit and the tag is more than a second threshold value. Here, when the first condition is the condition that communication between the tag communication unit and the tag is established, the second condition may be a condition that communication is not established, or the condition that the distance between the tag communication unit and the tag is more than a second threshold value.

In addition, when the first condition is the condition that the distance between the tag communication unit and the tag is equal to or less than a first threshold value, the condition that the communication is not established, or the condition that the distance between the tag communication unit and the tag is more than a second threshold value may be used as the second condition.

Note that the first threshold value and the second threshold value may be, for example, the same value, or may be different values.

Configuration Example 2

The asset management system according to [Configuration example 1], in which the position information acquisition unit acquires position information corresponding to a measurement result of measuring the environmental magnetic field information in real time by referring to a correspondence between environmental magnetic field information and position information prepared in advance. Here, the magnetic position correspondence table 1111 shown in FIG. 3 is an example of the correspondence between environmental magnetic field information (magnetic information) and position information when it is generated for an environmental magnetic field.

In this case, a measurement result of measuring the environmental magnetic field information in real time is used as the magnetic information of the environmental magnetic field.

Configuration Example 3

The asset management system according to [Configuration example 1] or [Configuration example 2], in which the position information acquisition unit acquires the position information by using information of pedestrian dead reckoning.

Configuration Example 4

The asset management system according to any one of [Configuration example 1] to [Configuration example 3], in which the position information acquisition unit acquires the position information by using information of vehicle dead reckoning. Note that, for example, any one of the information of pedestrian dead reckoning and the information of vehicle dead reckoning may be used, or both may be used, meaning that the system can manage a part of the assets using PDR and manage remaining assets using VDR.

Configuration Example 5

The asset management system according to any one of [Configuration example 1] to [Configuration example 4], in which the tag has at least one type of function among an RFID, a Bluetooth (registered trademark), a BLE, an NFC, an UWB, a QR code, and a bar code.

Configuration Example 6

The asset management system according to any one of [Configuration example 1] to [Configuration example 5], in which the terminal holding object is a person, a motor vehicle, or a robot that can travel autonomously. Note that a configuration in which a motor vehicle and a robot are integrated may be used, and in this case, it may be called a motor vehicle, may be called a robot, or may also be called any other name.

Configuration Example 7

The asset management system according to any one of [Configuration example 1] to [Configuration example 6], in which the terminal unit is configured from a position acquisition terminal device having the position information acquisition unit and a tag communication terminal device having the tag communication unit, and these devices are separate bodies or an integrated body. For example, it is possible to provide various processing methods (for example, an asset management method) performed by the asset management system.

Configuration Example 8

An asset management method that manages an asset by a terminal unit held by a terminal holding object, to which a tag capable of identifying individual information is attached, comprising:
communicating, by a tag communication unit, with the tag to read the individual information,
acquiring, by a position information acquisition unit, position information, and starting, by the position information acquisition unit, to acquire the position information as information on the asset to which the tag is attached when a first condition is satisfied, and ending acquisition of the position information when a second condition is satisfied, in which the first condition is at least one of a condition that communication between the tag communication unit and the tag is established and a condition that the distance between the tag communication unit and the tag is equal to or less than a first threshold value, and the second condition is at least one of a condition that the communication is not established and a condition that the distance between the tag communication unit and the tag is more than a second threshold value.

EXPLANATION OF REFERENCES

1 Asset management system
11, 11b, 411-1 to 411-M Terminal unit
12, 431-1 to 431-N Asset
21 User
31 Position acquisition terminal device
31a Smartphone
32 Tag communication terminal device
32a RFID scanner
51, 51a, 51b Tag
111 Trigger receiving unit
112 Position information acquisition unit
113, 452 Storage unit
151 Tag communication unit
152 Trigger generation unit
211 Magnetic information detection unit
212 GPS unit
213 DR unit
311 Management area
331a to 331d User position
341a to 341d Asset position
401 Comprehensive asset management system
421 Server device
451 Communication unit
1111 Magnetic position correspondence table
1121 Management table
1131 Comprehensive asset management table

What is claimed is:

1. An asset management system that manages an asset to which a tag capable of identifying individual information is attached, comprising:
a terminal unit that is held by a terminal holding object, wherein the terminal unit includes a tag communication unit that communicates with the tag to read the individual information, and a position information acquisition unit that acquires position information,
the position information acquisition unit starts to acquire the position information as information on the asset to which the tag is attached when a first condition is satisfied, and ends acquisition of the position information when a second condition is satisfied,
the first condition is at least one of a condition that communication between the tag communication unit and the tag is established and a condition that the distance between the tag communication unit and the tag is equal to or less than a first threshold value, and
the second condition is at least one of a condition that the communication is not established and a condition that the distance between the tag communication unit and the tag is more than a second threshold value.

2. The asset management system according to claim 1, wherein the position information acquisition unit acquires position information corresponding to a measurement result of measuring the Earth's environmental magnetic field information in real time by referring to a correspondence between environmental magnetic field information and position information prepared in advance.

3. The asset management system according to claim 1 or 2, wherein the position information acquisition unit acquires the position information by using information of pedestrian dead reckoning.

4. The asset management system according to claim 1 or 2, wherein the position information acquisition unit acquires the position information by using information of vehicle dead reckoning.

5. The asset management system according to claim 1 or 2, wherein the tag has at least one type of function among radio frequency identification (RFID), Bluetooth®, Bluetooth® Low Energy (BLE), near-field communication (NFC), ultra-wideband (UWB), quick response (QR) code, and bar code.

6. The asset management system according to claim 1 or 2, wherein the terminal holding object is a person, a motor vehicle, or a robot that can travel autonomously.

7. The asset management system according to claim 1 or 2, wherein the terminal unit is configured from a position acquisition terminal device having the position information acquisition unit and a tag communication terminal device having the tag communication unit, and these devices are separate bodies or an integrated body.

8. An asset management method that manages an asset by a terminal unit held by a terminal holding object, to which a tag capable of identifying individual information is attached, comprising:
communicating, by a tag communication unit, with the tag to read the individual information, wherein the terminal unit includes the tag communication unit;
acquiring, by a position information acquisition unit, position information, wherein the terminal unit includes the position information acquisition unit; and
starting, by the position information acquisition unit, to acquire the position information as information on the asset to which the tag is attached when a first condition is satisfied, and ending acquisition of the position information when a second condition is satisfied,
wherein the first condition is at least one of a condition that communication between the tag communication unit and the tag is established and a condition that the distance between the tag communication unit and the tag is equal to or less than a first threshold value, and
the second condition is at least one of a condition that the communication is not established and a condition that the distance between the tag communication unit and the tag is more than a second threshold value.

* * * * *